(12) United States Patent
Kataoka (10) Patent No.: US 11,441,807 B2
(45) Date of Patent: Sep. 13, 2022

(54) AIR CONDITIONER

(71) Applicant: DAIKIN INDUSTRIES, LTD., Osaka (JP)

(72) Inventor: Taro Kataoka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/433,467

(22) PCT Filed: Feb. 26, 2020

(86) PCT No.: PCT/JP2020/007663
§ 371 (c)(1),
(2) Date: Aug. 24, 2021

(87) PCT Pub. No.: WO2020/175531
PCT Pub. Date: Sep. 3, 2020

(65) Prior Publication Data
US 2022/0042709 A1 Feb. 10, 2022

(30) Foreign Application Priority Data

Feb. 27, 2019 (JP) .............................. JP2019-034444

(51) Int. Cl.
*B01D 46/46* (2006.01)
*B01D 46/66* (2022.01)
(Continued)

(52) U.S. Cl.
CPC .............. *F24F 11/65* (2018.01); *B01D 46/46* (2013.01); *B01D 46/66* (2022.01); *F24F 11/30* (2018.01); *B01D 2279/50* (2013.01); *F24F 8/10* (2021.01)

(58) Field of Classification Search
CPC .... B01D 46/46; B01D 46/66; B01D 2279/50; F24F 8/10; F24F 8/30; F24F 11/65; F24F 7/00; F24C 15/20; A23C 3/02
(Continued)

(56) References Cited

U.S. PATENT DOCUMENTS

| 7,270,691 B2 * | 9/2007 | Arts ....................... B01D 46/62 |
| | | 454/158 |
| 2014/0216251 A1 * | 8/2014 | Jun ....................... F24F 1/0047 |
| | | 95/26 |

(Continued)

FOREIGN PATENT DOCUMENTS

| CN | 105928071 A | 9/2016 |
| CN | 106545975 A | 3/2017 |

(Continued)

OTHER PUBLICATIONS

International Search Report (PCT/ISA/210) issued in PCT/JP2020/007663, dated Apr. 21, 2020.
(Continued)

*Primary Examiner* — Minh Chau T Pham
(74) *Attorney, Agent, or Firm* — Birch, Stewart, Kolasch & Birch, LLP (57) ABSTRACT

An air conditioner includes a controller that controls a driving unit of the air conditioner. The controller includes a determination unit that determines necessity of a contaminant reduction operation of the air conditioner based on whether the air conditioner is in a non-cooling operation period, and a setting unit that sets a condensation operation condition for forming condensed water on a surface of an indoor heat exchanger of the air conditioner. The controller performs the contaminant reduction operation of the air conditioner based on a necessity determination result of the (Continued)

determination unit in accordance with the condensation operation condition set by the setting unit.

10 Claims, 4 Drawing Sheets

(51) Int. Cl.
    *F24F 13/22*     (2006.01)
    *F24F 11/65*     (2018.01)
    *F24F 11/67*     (2018.01)
    *F24F 11/30*     (2018.01)
    *F24F 8/10*     (2021.01)

(58) Field of Classification Search
    USPC ............... 55/385.2, 356, 473, 485, DIG. 28, 55/DIG. 34; 454/158, 187, 229; 600/21; 128/205.26; 165/59, 66; 96/224

See application file for complete search history.

(56) References Cited

U.S. PATENT DOCUMENTS

| | | | |
|---|---|---|---|
| 2018/0100664 A1* | 4/2018 | Keogh | F24F 11/62 |
| 2020/0340699 A1* | 10/2020 | Ebina | F24F 5/0089 |
| 2021/0046800 A1* | 2/2021 | Goel | F25B 49/022 |
| 2021/0048200 A1* | 2/2021 | Honjo | F25B 49/02 |
| 2021/0215380 A1* | 7/2021 | Cai | F24F 13/20 |
| 2021/0302055 A1* | 9/2021 | Noor | F25B 49/02 |

FOREIGN PATENT DOCUMENTS

| | | |
|---|---|---|
| JP | 2005-292066 A | 10/2005 |
| JP | 2015-197250 A | 11/2015 |
| JP | 6387200 B1 | 9/2018 |

OTHER PUBLICATIONS

Extended European Search Report for Application No. EP 20762191.3. dated Mar. 15, 2022.

International Preliminary Report on Patentability and English translation of the Written Opinion of the International Searching Authority for International Application No. PCT/JP2020/007663, dated Aug. 25, 2021.

* cited by examiner

AIR CONDITIONER

TECHNICAL FIELD

The present disclosure relates to an air conditioner.

BACKGROUND ART

Patent Document 1 discloses a known technique applied to an air conditioner. The technique disclosed in Patent Document 1 obtains an image of a filter, binarizes the pixels of the image, divides the binarized image into predetermined blocks, and obtains a diagnostic value from data associated with the blocks.

PRIOR ART DOCUMENTS

Patent Documents

Patent Document 1: Japanese Laid-Open Patent Publication No. 2005-292066

SUMMARY OF THE INVENTION

Problems that the Invention is to Solve

Filters are not the only place where contaminants cause problems in an air conditioner. Contaminants are also not desirable in components other than filters. It is an objective of the present invention to provide an air conditioner that reduces contaminants.

Means for Solving the Problems

An air conditioner that solves the problems is configured to perform a cooling operation. The air conditioner includes a controller that controls a driving unit of the air conditioner. The controller includes a determination unit that determines necessity of a contaminant reduction operation of the air conditioner based on whether the air conditioner is in a non-cooling operation period and a setting unit that sets a condensation operation condition for forming condensed water on a surface of an indoor heat exchanger of the air conditioner. The controller performs the contaminant reduction operation of the air conditioner based on a necessity determination result of the determination unit in accordance with the condensation operation condition set by the setting unit.

In a cooling operation period, condensed water forms in the indoor heat exchanger and water collects in the drain pan. The water is drained from the drain pan. In the cooling operation period, condensed water is drained from the indoor heat exchanger through the drain pan to discharge contaminants from the indoor heat exchanger and the drain pan. In a non-cooling operation period, water is less likely to flow and contaminants easily collect in the indoor heat exchanger and the drain pan. With the above structure, the controller performs the contaminant reduction operation based on whether the air conditioner is in a non-cooling operation period. This restricts contaminant reduction operations during inappropriate periods and reduces contaminants collected during a non-cooling operation period.

In the above air conditioner, the determination unit determines whether the air conditioner is in a non-cooling operation period based on at least one of operation information or environmental information.

This allows the non-cooling operation period to be appropriately determined.

In the above air conditioner, the determination unit further determines a device state of the air conditioner and then determines the necessity of the contaminant reduction operation based on a determination result of the device state. This allows the contaminant reduction operation to be performed only when necessary and reduces unnecessary operations.

In the above air conditioner, the determination unit obtains a contaminant amount of at least one of a drain pan, a filter, or the indoor heat exchanger as the device state of the air conditioner and determines the necessity of the contaminant reduction operation based on the contaminant amount. This reduces contaminants that collect on at least one of the drain pan, the filter, or the indoor heat exchanger.

In the above air conditioner, when the determination unit determines that the contaminant reduction operation is necessary, the controller performs the contaminant reduction operation under a cooling operation allowance condition so that the contaminant reduction operation maintains indoor comfort. This allows the contaminant reduction operation to be performed without affecting indoor comfort.

MODES FOR CARRYING OUT THE INVENTION

Air conditioner

An air conditioner 1 according to the present embodiment will now be described.

Figure 1:
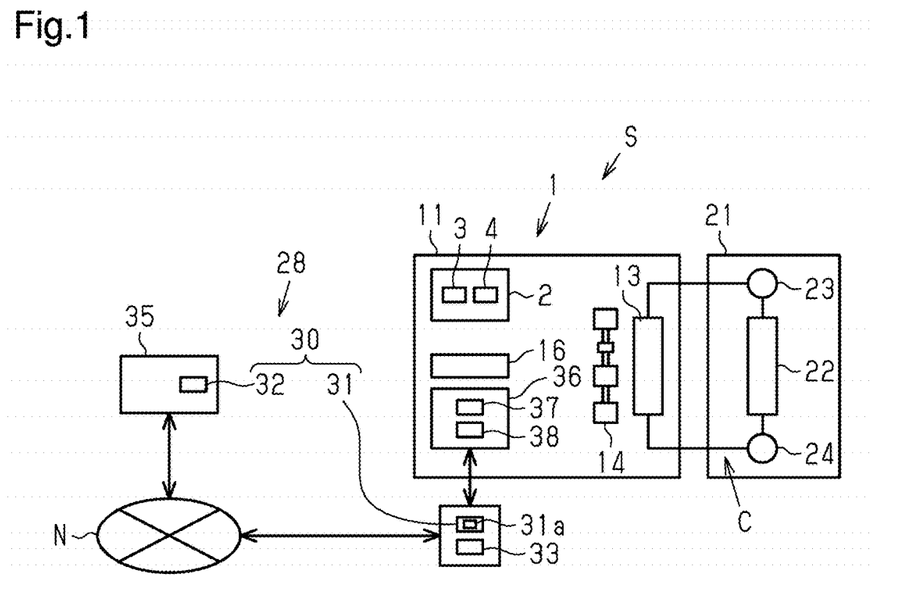
FIG. 1 is a schematic diagram illustrating an air conditioning system including an air conditioner.

The air conditioner 1 performs at least a cooling operation. Preferably, the air conditioner 1 performs a cooling operation and a heating operation. The air conditioner 1 includes a controller 2. Specifically, the air conditioner 1 includes a refrigerant circuit C. The refrigerant circuit C includes an indoor heat exchanger 13 for an indoor unit 11, an outdoor heat exchanger 22 for an outdoor unit 21, an expansion valve 23, and a compressor serving as a driving unit 24. The controller 2 controls the expansion valve 23 and the driving unit 24. The controller 2 includes one or more central processing units (CPU) or microprocessing units (MPU). The controller 2 may be circuitry including: 1) one or more processors that execute various processes according to a computer program (software); 2) one or more dedicated hardware circuits (application-specific integrated circuits: ASIC) that execute at least part of various processes, or 3) a combination thereof. The processor includes a CPU and memory such as RAM and ROM. The memory stores program code or commands configured to cause the CPU to execute processes. The memory, or computer-readable media, includes any type of media that is accessible by general-purpose computers or dedicated computers. The controller 2 controls the driving unit 24 to regulate the air temperature at a target temperature during a cooling operation. The target temperature is an indoor target temperature that is set by a user of the air conditioner 1.

The controller 2 further performs a contaminant reduction operation. The contaminant reduction operation is for reducing contaminants of the indoor unit 11. The contaminant reduction operation is part of a cooling operation. In the present embodiment, the contaminant reduction operation is performed to reduce contaminants of the indoor unit 11 in at least one of the indoor heat exchanger 13 or a drain pan 16.

The controller 2 controls the driving unit 24 so that water condenses on the indoor heat exchanger 13 of the indoor unit 11 during the contaminant reduction operation. The water condensed on the indoor heat exchanger 13 washes contaminants off the indoor heat exchanger 13. The condensed water from the indoor heat exchanger 13 collected in the drain pan 16 is drained out of the drain pan 16 by a drain pump 17. This reduces contaminants in the drain pan 16.

Specifically, the controller 2 includes a determination unit 3 and a setting unit 4. The controller 2 performs the contaminant reduction operation of the air conditioner 1 based on a necessity determination result of the determination unit 3 in accordance with condensation operation conditions set by the setting unit 4.

The setting unit 4 sets the condensation operation conditions. The condensation operation conditions are operation conditions for condensing water on the surface of the indoor heat exchanger 13 of the air conditioner 1. Specifically, the condensation operation conditions are operation conditions for lowering the surface temperature of the indoor heat exchanger 13 to the dew-point temperature of indoor air or lower. The condensation operation conditions include, for example, a target temperature of a refrigerant evaporation temperature. In a situation where defrosting is performed, the target temperature of the refrigerant evaporation temperature, which serves as the condensation operation conditions, is set to a temperature lower than the refrigerant evaporation temperature during defrosting. The rotation speed of a fan (not shown) of outdoor unit 21 is adjusted to promptly reach the target temperature of the refrigerant evaporation temperature. The condensation operation conditions may include the rotation speed of a fan 14 of the indoor unit 11. The setting unit 4 sets the above condensation operation conditions when the determination unit 3 determines that the contaminant reduction operation is necessary.

The determination unit 3 determines the necessity of the contaminant reduction operation of the air conditioner 1 based on whether the air conditioner 1 is in a non-cooling operation period. A cooling operation is not performed during a non-cooling period. When a cooling operation is performed, contamination of the air conditioner 1 is impeded by condensed water. When a cooling operation is not performed, contamination of the air conditioner 1 is susceptible to progress due to the lack of condensed water. The determination unit 3 determines that the air conditioner 1 requires the contaminant reduction operation when determining that the air conditioner 1 is in a non-cooling operation period. The determination unit 3 determines that the air conditioner 1 does not require the contaminant reduction operation when determining that the air conditioner 1 is not in a non-cooling operation period.

The determination unit 3 determines whether the air conditioner 1 is in a non-cooling operation period based on at least one of operation information or environmental information. The operation information indicates whether a cooling operation or a heating operation is being performed. The environmental information indicates the ambient environment of the air conditioner 1, in particular, the temperature.

Specifically, the determination unit 3 determines whether the air conditioner 1 is in a non-cooling operation period based on at least one of conditions (a) to (e), which are described below. Conditions in (a) to (e) are satisfied in a non-cooling operation period.

(a) No cooling operation has been performed for a predetermined period. Alternatively, the cooling operation switch of a remote controller has not been pushed by the user for a predetermined period. The predetermined period may be, for example, one week. If no cooling operation has been performed for one week, it can be presumed that this is a period during which a cooling operation is not performed. The determination unit 3 periodically obtains cooling operation information from the controller 2 or instructions from the remote controller to determine whether the condition (a) is satisfied.

(b) A heating operation has been performed for a predetermined time. The predetermined time may be, for example, one hour. The predetermined period may be, for example, one day. If a heating operation has been performed for one hour or longer, it can be presumed this is a period during which a cooling operation is not performed. Alternatively, the heating operation switch of the remote controller has been pushed at least once by the user during a predetermined period. If a heating operation is performed once during one day, it can be presumed that this is a period during which a cooling operation is not performed. The determination unit 3 periodically obtains heating operation information from the controller 2 or instructions from the remote controller to determine whether the condition in (b) is satisfied.

(c) The present date belongs to a non-cooling operation season. The non-cooling operation season is preset. The non-cooling operation season is set to, for example, November to April. The determination unit 3 has calendar information defining the non-cooling operation season and checks whether the present date is in the non-cooling operation season to determine whether the condition (c) is satisfied.

(d) The indoor target temperature is within the range of a winter preset temperature. If the indoor target temperature is within the range of the winter preset temperature, it can be presumed that this is a period during which a cooling operation is not performed. The determination unit 3 periodically obtains information on the preset temperature range from the remote controller to determine whether the condition in (d) is satisfied.

(e) The average outdoor temperature of the day is lower than or equal to a predetermined temperature. The predetermined temperature may be, for example, 12 degrees Celsius. If the average outdoor temperature of the day is lower than or equal to the predetermined temperature, it can be presumed that this is a period during which a cooling operation is not performed. The determination unit 3 obtains the outdoor temperature to determine whether the condition in (e) is satisfied.

Preferably, the determination unit 3 determines the device state of the air conditioner 1. The determination unit 3 determines the necessity of a contaminant reduction operation based on a determination result of the device state. The device state of the air conditioner 1 indicates the contamination state. When the contaminant amount in the air conditioner 1 exceeds a determination value, the controller 2 determines that a contaminant reduction operation is necessary. When contaminant amount in the air conditioner 1 is less than or equal to the determination value, the controller 2 determines that a contaminant reduction operation is unnecessary.

For example, the controller 2 obtains the contaminant amount from at least one of the drain pan 16, a filter, or the indoor heat exchanger 13 as the device state of the air conditioner 1. The controller 2 determines the necessity of a contaminant reduction operation based on the contaminant amount. For example, the contaminant amount is detected by a contamination detection device 28 that will be described later. An example of the contaminant amount is the "contamination degree" calculated by the contamination detection device 28. In one example, the controller 2 obtains the contaminant amount of from a calculation unit 32 of the contamination detection device 28. As described later, if the calculation unit 32 is included in a network N, the controller 2 obtains contamination-related information (for example, contaminant amount) from the calculation unit 32 via the network N.

Preferably, when the controller 2 determines that a contaminant reduction operation is necessary for the indoor unit 11, the controller 2 performs the contaminant reduction operation under a cooling operation allowance condition so that the contaminant reduction operation maintains indoor comfort.

Although the contaminant reduction operation is performed during a non-cooling operation period, the contaminant reduction operation includes a cooling operation performed at the indoor side thereby lowering the room temperature. If the contaminant reduction operation is performed when someone is in the room, the room may become uncomfortable. To avoid such a situation, the controller 2 performs the contaminant reduction operation when the cooling operation allowance condition is satisfied. The cooling operation allowance condition includes at least one of a condition in which nobody is in the room where the indoor unit 11 is installed, a condition in which the current time is not in a time during which a person is usually inside the room where the indoor unit 11 is installed, or a condition in which the room temperature is much higher than the target temperature.

Contamination Detection Device

An example of the contamination detection device 28 will now be described. The contamination detection device 28 detects contamination of a subject 29. Contamination in the present embodiment includes at least one of collected contaminants or water turbidity. The detection of contamination detection includes the detection of collected contaminants, the detection of turbidity, and the detection of both collected contaminants and turbidity.

Preferable examples of the subject 29 of contamination detection include a device that easily becomes wet and a container that contains water. For example, the subject 29 of contamination detection may be the drain pan 16 of the indoor unit 11, the indoor heat exchanger 13 of the indoor unit 11 in the air conditioner 1, or the filter of the air conditioner 1. In the present embodiment, the contamination detection device 28 detects contamination of the drain pan 16 in the indoor unit 11 of the air conditioner 1. That is, the subject 29 is the drain pan 16 in the present embodiment.

The contamination detection device 28 includes a control unit 30. The control unit 30 obtains a captured image 40 of the subject 29. The control unit 30 calculates the contamination degree from the color components of the captured image 40 of the subject 29. The control unit 30 includes one or more central processing units (CPU) or micro processing units (MPU). The control unit 30 may be circuitry including: 1) one or more processors that execute various processes according to a computer program (software); 2) one or more dedicated hardware circuits (application-specific integrated circuits: ASIC) that execute at least part of various processes, or 3) a combination thereof. The processor includes a CPU and memory such as RAM and ROM. The memory stores program code or commands configured to cause the CPU to execute processes. The memory, or computer-readable media, includes any type of media that is accessible by general-purpose computers or dedicated computers.

The control unit 30 includes an obtaining unit 31 that obtains a captured image 40 of the subject 29, and a calculation unit 32 that calculates the contamination degree from color components of the captured image 40 of the subject 29. The obtaining unit 31 is connected to a camera 36. The obtaining unit 31 and the calculation unit 32 may be accommodated in a case and integrated as a single device. Alternatively, as will described below, the obtaining unit 31 and the calculation unit 32 may be connected to a network N and spread apart at different locations. The components of the control unit 30 according to the present embodiment are spread apart over the network N.

The obtaining unit 31 is arranged in the air conditioner 1 or in the vicinity of the air conditioner 1.

The obtaining unit 31 obtains and stores a captured image 40 sent by the camera 36. The obtaining unit 31 stores identification information of the subject 29 or a device including the subject 29. In the present embodiment, the obtaining unit 31 stores identification information of the air conditioner 1. Preferably, the obtaining unit 31 stores location information of the subject 29 or the device including the subject 29. The location information includes the location of the subject 29 (latitude and longitude or address). In the present embodiment, the obtaining unit 31 stores location information of the air conditioner 1 that includes the drain pan 16. More preferably, the obtaining unit 31 stores purpose information of a device including the subject 29. The purpose information indicates the purpose for using the room in which the subject 29 is installed, for example, what type of shop the room is. The obtaining unit 31 obtains identification information, location information, and purpose information in response to an input operation. The obtaining unit 31 is connected to a communication unit 33. The communication unit 33 may be an element of the control unit 30.

The communication unit 33 controls communication between the obtaining unit 31 and the calculation unit 32. The communication unit 33 outputs the captured image 40, which is stored in the obtaining unit 31, to the calculation unit 32 based on an internal instruction and an external instruction. Preferably, the communication unit 33 outputs at least one of the identification information, the location information, or the purpose information stored in the obtaining unit 31 to the calculation unit 32 based on an internal instruction and an external instruction. The internal instruction is issued at a preset time. For example, the internal instruction is issued by an internal circuit of the communication unit 33 periodically or when a predetermined condition is satisfied (for example, wireless communication has higher reception sensitivity than predetermined value). The external instruction is issued based on a request from the calculation unit 32 of a cloud server 35. The communication unit 33 and the obtaining unit 31 may be accommodated in the same case.

The calculation unit 32 may be installed anywhere as long as the calculation unit 32 obtains information from the obtaining unit 31. For example, the calculation unit 32 is arranged in the cloud server 35 that is connected to the network N.

As shown in FIG. 1, the contamination detection device 28 may be an element of an air conditioning system S. For example, the air conditioning system S includes the contamination detection device 28 and the air conditioner 1. The air conditioner 1 is connected to the network N directly or by the communication unit 33 of the control unit 30 of the contamination detection device 28.

Figure 2:
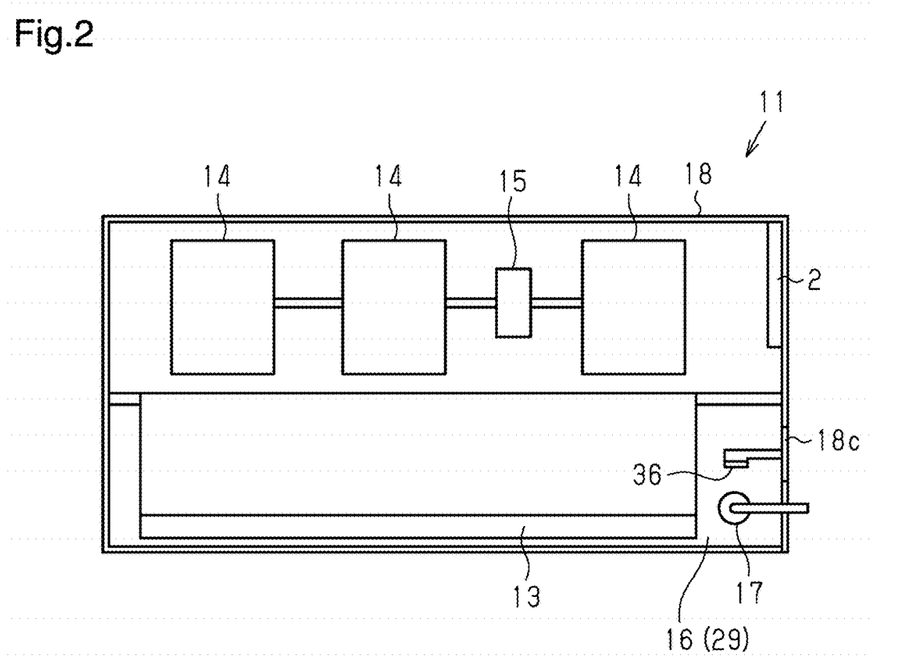
FIG. 2 is a plan view of the inner structure of an indoor unit.
Figure 3:
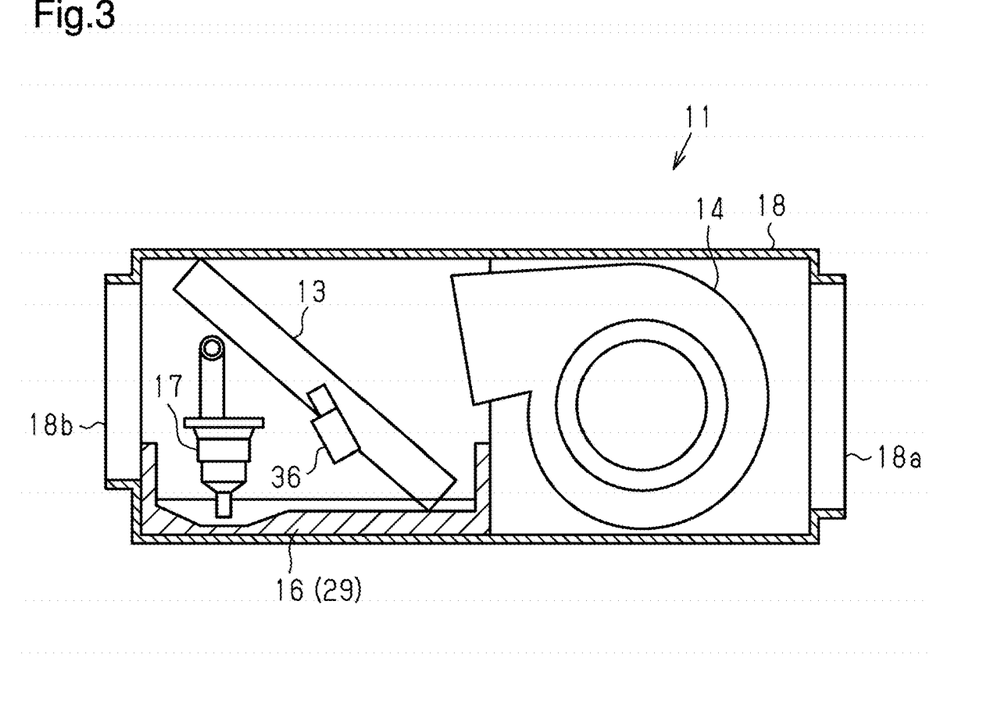
FIG. 3 is a side view of the inner structure of the indoor unit.

The air conditioner 1 will now be described with reference to FIGS. 2 and 3. FIG. 2 is a plan view of the inner structure of the indoor unit 11 when the top wall of the indoor unit 11 of the air conditioner 1 is removed. FIG. 3 is a side view of the inner structure of the indoor unit 11 when the side wall of the indoor unit 11 of the air conditioner 1 is removed.

There is no limit to the type of the air conditioner 1 that is tested for contamination. For example, the air conditioner 1 of a ceiling-embedded type may be tested for contamination. The indoor unit 11 of the ceiling-embedded air conditioner 1 requires time to be internally tested. Thus, the camera monitoring of the indoor unit 11 of the ceiling-embedded air conditioner 1 improves the maintenance work efficiency. In the present embodiment, the indoor unit 11 of the ceiling-embedded air conditioner 1 is connected to a ceiling duct. The indoor unit 11 is connected to the outdoor unit 21 by a refrigerant pipe. The indoor unit 11 is installed in the ceiling.

As shown in FIGS. 2 and 3, in the indoor unit 11 of the present embodiment, a box case 18 accommodates the controller 2 and the indoor heat exchanger 13. The box case 18 also accommodates the fan 14, a fan motor 15 that rotates the fan 14, the drain pan 16, and the drain pump 17 that drains water out of the drain pan 16. The drain pan 16 is arranged under the indoor heat exchanger 13. The box case 18 includes an intake port 18a and a blow-out port 18b. The wall color of the drain pan 16 is preferably set so that contamination is distinguishable. The wall color of the drain pan 16 is preferably set to white or a color close to white.

The box case 18 includes a maintenance lid 18c used when conducting maintenance of the inside of the box case 18. The maintenance lid 18c is arranged in proximity to the drain pan 16 and the drain pump 17. The camera 36 is attached to the inner side of the maintenance lid 18c. The camera 36 is attached to the maintenance lid 18c to capture an image of at least part of the bottom of the drain pan 16.

The camera 36 includes an image capturing unit 37 and an image capturing controller 38 (refer to FIG. 1). The image capturing unit 37 captures an image of part of the drain pan 16 when under the control of the image capturing controller 38 to form a captured image 40. The image capturing controller 38 includes one or more central processing units (CPU) or microprocessing units (MPU). The image capturing controller 38 may be circuitry including: 1) one or more processors that execute various processes according to a computer program (software); 2) one or more dedicated hardware circuits (application-specific integrated circuits: ASIC) that execute at least part of various processes, or 3) a combination thereof. The processor includes a CPU and memory such as RAM and ROM. The memory stores program code or commands configured to cause the CPU to execute processes. The memory, or computer-readable media, includes any type of media that is accessible by general-purpose computers or dedicated computers.

In one example, the image capturing unit 37 captures an image of the drain pan 16 on condition that the water surface is still. The image capturing controller 38 determines whether the still water surface condition is satisfied. The still water surface state refers to a state in which the water surface in the drain pan 16 remains still. The image capturing controller 38 determines whether the still water surface condition is satisfied based on at least one of an action of the drain pump 17, rotation of the fan 14, or a change in the captured images 40 obtained by continuously monitoring the captured images 40. The image capturing controller 38 issues an image-capturing instruction to the image capturing unit 37 when the still water surface condition is satisfied. For example, the image capturing controller 38 determines whether the still water surface condition is satisfied when detecting collected contaminants.

In another example, the image capturing unit 37 captures an image of the drain pan 16 on condition that water is flowing. The image capturing controller 38 determines whether the flowing water condition is satisfied. Water flows in a state in which the water in the drain pan 16 is in motion. The image capturing controller 38 determines whether the flowing water condition is satisfied based on at least one of an action of the drain pump 17 or a change in the captured images 40 obtained by continuously monitoring the captured images 40. The image capturing controller 38 issues an image-capturing instruction to the image capturing unit 37 when the flowing water condition is satisfied. For example, the image capturing controller 38 determines whether the flowing water condition is satisfied when detecting turbidity as contamination.

The image capturing controller 38 controls the time at which image capturing is performed as described above. The image capturing controller 38 transmits a captured image 40, which is formed by the image capturing unit 37, to the obtaining unit 31. The image capturing controller 38 transmits the captured image 40 to the obtaining unit 31 in response to an internal instruction. The internal instruction is preset.

The captured image 40 is transmitted to the calculation unit 32 as described below. The captured image 40 formed by the image capturing unit 37 of the camera 36 is output to the obtaining unit 31 and stored in a storage unit 31a of the obtaining unit 31. The captured image 40 stored in the obtaining unit 31 is transmitted to the calculation unit 32 of the cloud server 35 via the network N in response to an internal instruction of the communication unit 33 or an external instruction.

Figure 4:
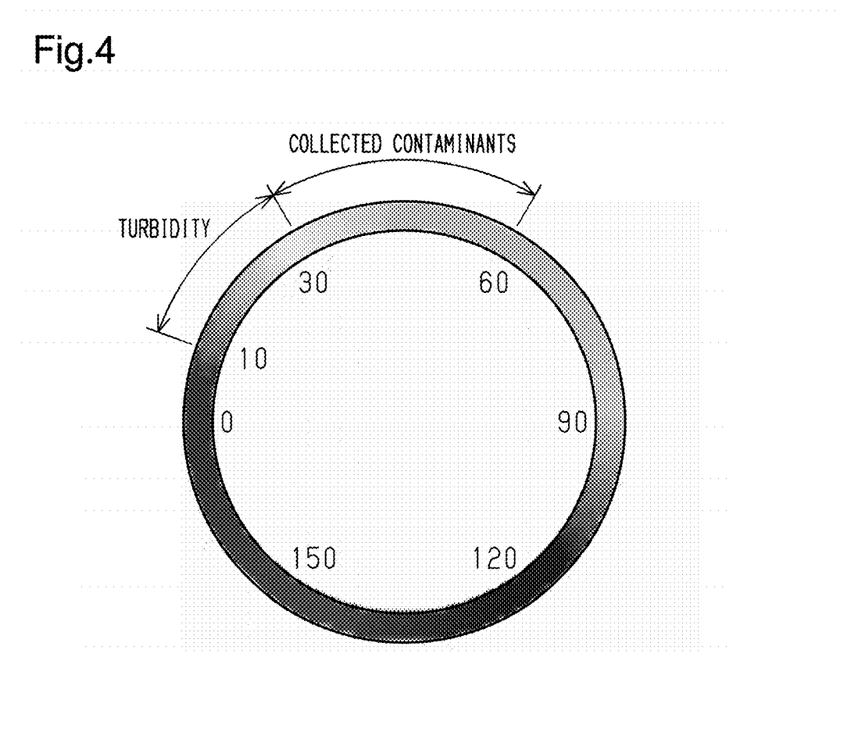
FIG. 4 is a diagram showing a color circle that has a range of collected contaminants and a range of turbidity.

The calculation unit 32 of the control unit 30 will now be described with reference to FIG. 4.

The calculation unit 32 digitizes contamination of the subject 29 in response to an instruction of a user or at a predetermined time. Specifically, the calculation unit 32 calculates the hue of each pixel forming the captured image 40 of the drain pan 16. When the captured image 40 is formed in RGB format, the calculation unit 32 converts the captured image 40 based on the RGB to HSV conversion formula to obtain a value of the hue (H) for each pixel.

Contamination of the drain pan 16 will now be described. A hue analysis of contamination of the drain pan 16 indicates that contaminants have a reddish yellow-green color (hue: 10 to 30) or a green color (hue: 30 to 60). The hue of contamination ranges from 10 to 60. Collected contaminants have a green color or a color in the periphery of green and the hue of collected contaminants ranges from 30 to 60. Turbidity has a reddish yellow-green color and the hue of turbidity ranges from 10 to less than 30. The hues of collected contaminants and turbidity of the drain pan 16 differ from the hue of the wall of the drain pan 16. This allows contamination of the drain pan 16 to be detected from the hue. Further, the hue of collected contaminants differing from the hue of turbidity allows collected contaminants to be distinguished from turbidity using the hue.

Preferably, a subject zone 40*a* serving as a contamination detection subject is set in the captured image 40 to accurately detect contamination of the drain pan 16. The captured image 40 may include part of the indoor heat exchanger 13 and part of the drain pump 17. In this case, the subject zone 40*a* for contamination detection is obtained by removing the indoor heat exchanger 13 and the drain pump 17 from the entire field of the captured image 40. The subject zone 40*a* is preset. The calculation unit 32 detects contamination in the subject zone 40*a*.

Figure 5:
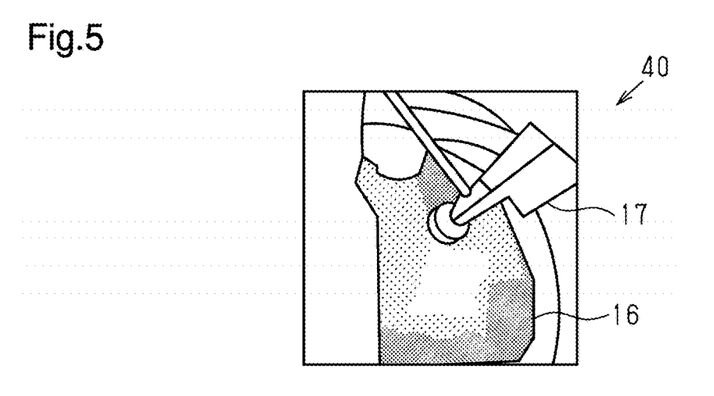
FIG. 5 is a diagram of a captured image.
Figure 6:
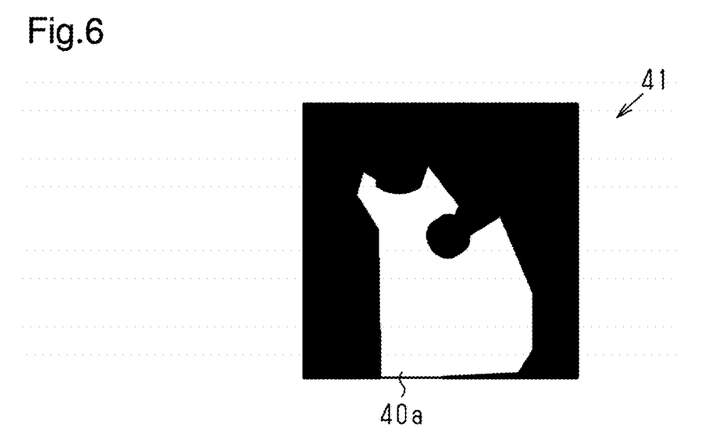
FIG. 6 is a diagram of a mask.
Figure 7:
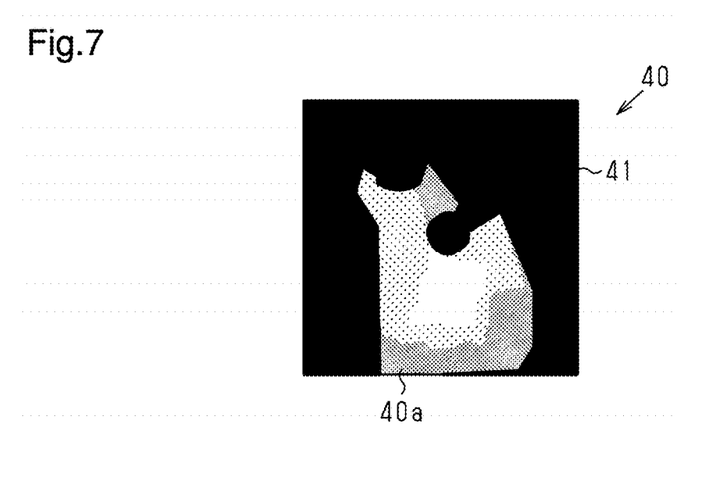
FIG. 7 is a diagram in which the mask is superposed on the captured image.
Figure 8:
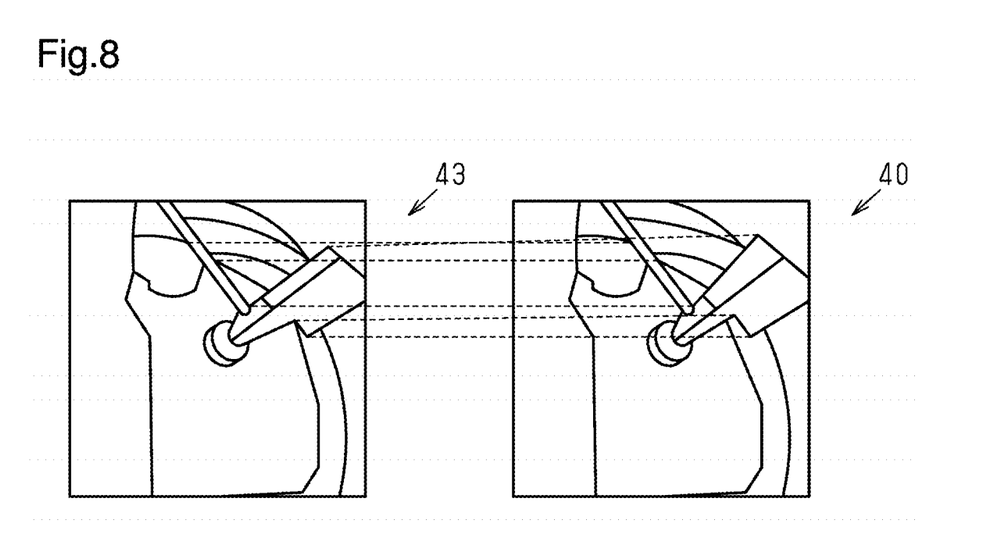
FIG. 8 is a diagram illustrating matching between a captured image template and a captured image.
Figure 9:
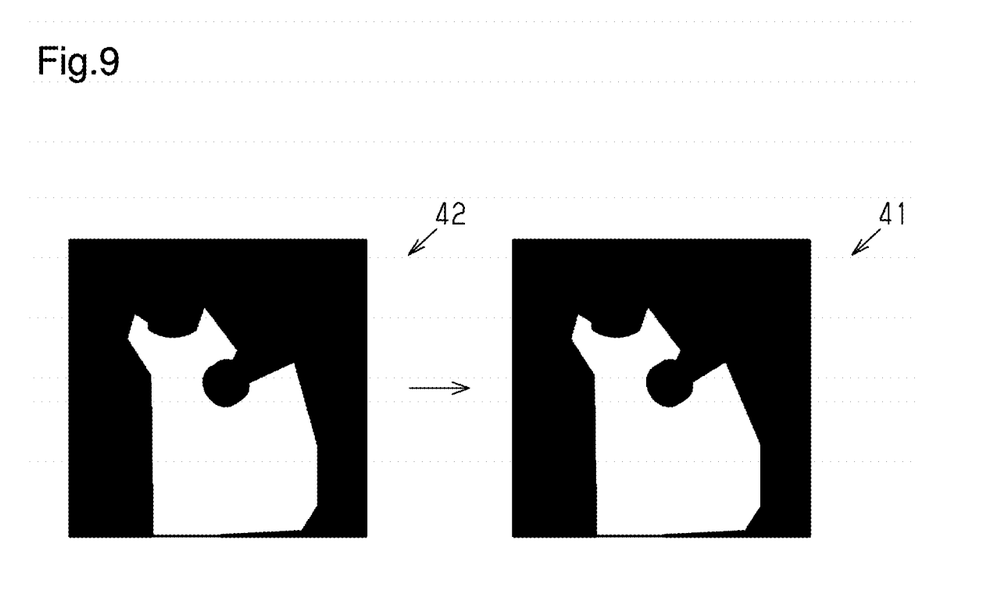
FIG. 9 is a diagram illustrating the relationship between a mask template and a mask.

One example of the setting of the subject zone 40*a* will now be described with reference to FIGS. 5 to 9. FIG. 5 is a diagram of the captured image 40. FIG. 6 is a diagram of a mask 41. FIG. 7 is a diagram in which the mask 41 is superposed on the captured image 40. In FIG. 7, the dark dotted field indicates a field of collected contaminants and the light dotted field indicates a field of turbidity. In the captured image 40 of FIG. 7, the field of collected contaminants cannot be clearly distinguished from the light dotted field through visual observation. FIG. 8 is a diagram illustrating matching between a captured image template 43 and the captured image 40. FIG. 9 is a diagram illustrating the relationship between a mask template 42 and the mask 41.

The calculation unit 32 stores the mask 41 superposed on the captured image 40. In the mask 41, the field outside the subject zone 40*a* of the captured image 40 is black and does not have a hue value. In the mask 41, a field inside the subject zone 40*a* of the captured image 40 is transparent. The captured image 40 on which the mask 41 is superposed is black outside the subject zone 40*a*. Since the color of black color has no corresponding hue value, when the area of each hue in the captured image 40 is calculated, the area of the portion in black is 0. Thus, when the calculation unit 32 calculates the area of each hue in the entire field of the captured image 40 on which the mask 41 is superposed, the area of each hue in the field inside the subject zone 40*a* of the captured image 40 will be calculated. The area of each hue in the field inside the subject zone 40*a* of the captured image 40 is easily calculated by using the mask 41 in this manner.

The calculation unit 32 stores a captured image template 43 prepared in advance for each model of the air conditioner 1 and a mask template 42 formed in advance for each model of the air conditioner 1. Even if the air conditioner 1 is of the same model, variations in how the camera 36 is installed may result in differences in the position of the drain pan 16 in the captured image 40. Thus, in order to accurately detect contamination of the drain pan 16, it is preferred that the mask 41 be matched with the drain pan 16 of each air conditioner 1. For example, the calculation unit 32 matches the features of the captured image template 43 with the features of the captured image 40, which is the subject of contamination detection (refer to FIG. 8) and forms a projection conversion matrix based on the matching result of association. The calculation unit 32 uses the formed projection conversion matrix to convert the mask template 42 to the mask 41 (refer to FIG. 9).

The calculation unit 32 calculates the contamination degree as follows. In one example, the contamination degree is evaluated from the spread contaminated field.

(a) In a first example, the calculation unit 32 calculates the contamination degree based on the area of a field in the subject zone 40*a* of the captured image 40 that is within a predetermined hue range. Specifically, the calculation unit 32 forms the mask 41 suited for the captured image 40 based on the mask template 42 as described above. The calculation unit 32 calculates the area of the field in the subject zone 40*a* that is within the predetermined hue range from the captured image 40 on which the mask 41 is superposed. For example, when the calculation unit 32 calculates the area of collected contaminants, the calculation unit 32 obtains the area of the collected contaminants by counting the number of pixels of which the hues are greater than or equal to 30 and less than or equal to 60 from the captured image 40 on which the mask 41 is superposed. When the calculation unit 32 calculates the area of turbidity, the calculation unit 32 obtains the area of turbidity by counting the number of pixels of which the hues are greater than or equal to 10 and less than or equal to 30 from the captured image 40 on which the mask 41 is superposed. The calculation unit 32 may use the total of the area of collected contaminants and the area of turbidity as the area of contamination. The calculation unit 32 outputs the area of contamination as the contamination degree. The calculation unit 32 may output the area of collected contaminants as the collected contaminant degree and the area of turbidity as the turbidity degree.

(b) In a second example, the calculation unit 32 calculates the contamination degree based on the area ratio of the area of the subject zone 40*a* of the captured image 40 to the area of a field in the subject zone 40*a* of the captured image 40 that is within a predetermined hue range. In this case, the contamination degree is represented on a percentage basis. A contamination degree of 100% suggests that contamination has advanced to maximum.

The operation of the present embodiment will now be described.

The air conditioner 1 will be contaminated due to various factors. Air contamination results in contaminants collecting on the indoor heat exchanger 13 and the drain pan 16. When water is stagnant in the drain pan 16, bacteria increases and contamination spreads in the drain pan 16. The spreading contamination of the indoor heat exchanger 13 and the drain pan 16 easily clogs the drain pump 17. Contamination tends to spread especially during a non-cooling operation period. In a cooling operation period, condensed water washes contaminants off the indoor heat exchanger 13 and the drain pan 16 of the indoor unit 11. In the non-cooling operation period, condensed water is not likely to form and contamination easily spreads in the indoor heat exchanger 13 and the drain pan 16 of the indoor unit 11. In particular, in a period after a non-cooling operation period and immediately before a cooling operation is started, contaminants may be deposited on the drain pan 16 or the indoor heat exchanger 13. When a cooling operation is performed under such a situation, condensed water suddenly flowing together with the deposited contaminants may easily clog the drain pump 17.

The air conditioner 1 of the present embodiment performs a contaminant reduction operation during a non-cooling operation period. This reduces contaminants that form or collect on the drain pan 16. Thus, failures resulting from contamination are reduced.

The present embodiment has the following advantages.

(1) The controller 2 of the air conditioner 1 includes the determination unit 3 and the setting unit 4. The determination unit 3 determines the necessity of the contaminant reduction operation of the air conditioner 1 based on whether the air conditioner 1 is in a non-cooling operation period. The setting unit 4 sets condensation operation conditions for forming condensed water on the surface of the indoor heat exchanger 13 of the air conditioner 1. The controller 2 performs the contaminant reduction operation of the air conditioner 1 based on the necessity determination result of the determination unit 3 in accordance with the condensation operation conditions set by the setting unit 4.

In a cooling operation period, condensed water forms in the indoor heat exchanger 13 and water collects in the drain pan 16. The water is drained from the drain pan 16. In the cooling operation period, condensed water is drained from the indoor heat exchanger 13 through the drain pan 16 to discharge contaminants from the indoor heat exchanger 13 and the drain pan 16. In a non-cooling operation period, water is less likely to flow and contaminants easily collect in the indoor heat exchanger 13 and the drain pan 16. With the above structure, the controller 2 performs the contaminant reduction operation based on whether the air conditioner 1 is in a non-cooling operation period. This restricts contaminant reduction operations during inappropriate periods and reduces contaminants collected during a non-cooling operation period.

(2) The determination unit 3 determines whether the air conditioner 1 is in a non-cooling operation period based on at least one of operation information or environmental information.

This allows the non-cooling operation period to be appropriately determined.

(3) The determination unit 3 determines the device state of the air conditioner 1 and then determines the necessity of a contaminant reduction operation based on a determination result of the device state. This allows the contaminant reduction operation to be performed only when necessary and reduces unnecessary operations.

(4) The determination unit 3 obtains the contaminant amount from at least one of the drain pan 16, the filter, or the indoor heat exchanger 13 as the device state of the air conditioner 1 and determines the necessity of a contaminant reduction operation based on the contaminant amount. This reduces contaminants that collect on at least one of the drain pan 16, the filter, or the indoor heat exchanger 13.

(5) When the determination unit 3 determines that a contaminant reduction operation is necessary, the controller 2 performs the contaminant reduction operation under a cooling operation allowance condition so that the contaminant reduction operation maintains indoor comfort. This allows the contaminant reduction operation to be performed without affecting indoor comfort.

Modifications

The contamination detection device 28 of the present disclosure may be modified as follows in addition to the above embodiment or have a mode in which at least two modifications are combined as long as the modifications are consistent with each other.

In the above embodiment, in an air conditioning system in which a single outdoor unit 21 is connected to multiple indoor units 11, the management device of the air conditioning system may sequentially perform a contaminant reduction operation for the indoor units 11.

The contaminant amount obtained by the determination unit 3 may be detected by any means including the detection device as described above. In the above embodiment, the contamination detection device 28 detects the contamination degree (contaminant amount) of the drain pan 16 based on color components. Instead, the contaminant amount may be obtained through the reflectance of light.

In the above embodiment, the contamination detection device 28 detects contamination of the drain pan 16. Alternatively, the contamination detection device 28 may detect the contaminant amount of the filter or the contaminant amount of the indoor heat exchanger 13. In this case, the determination unit 3 determines the necessity of a contaminant reduction operation based on such contaminant amount.

The obtaining unit 31 and the control unit 30 of the contamination detection device 28 may form a single unit. Such a contamination detection device 28 is arranged proximate to the air conditioner 1. In this case, the contamination detection device 28 may directly communicate with an external device (such as user terminal) and not through the network N.

Although the present device according to the embodiment has been described above, it will be understood that various changes in form and details can be made without departing from the spirit and scope of the present device in the claims.

The invention claimed is:

1. An air conditioner configured to perform a cooling operation, the air conditioner comprising:
a controller that controls a driving unit of the air conditioner, wherein the controller includes
a determination unit that determines necessity of a contaminant reduction operation of the air conditioner based on whether the air conditioner is in a non-cooling operation period, and
a setting unit that sets a condensation operation condition for forming condensed water on a surface of an indoor heat exchanger of the air conditioner,
wherein the controller performs the contaminant reduction operation of the air conditioner when the air conditioner is in the non-cooling operation period, based on a necessity, determination result of the determination unit in accordance with the condensation operation condition set by the setting unit.

2. The air conditioner according to claim 1, wherein the determination unit determines whether the air conditioner is in a non-cooling operation period based on at least one of operation information or environmental information.

3. The air conditioner according to claim 1, wherein the determination unit further determines a device state of the air conditioner and then determines the necessity of the contaminant reduction operation based on a determination result of the device state.

4. The air conditioner according to claim 3, wherein the determination unit obtains a contaminant amount of at least one of a drain pan, a filter, or the indoor heat exchanger as the device state of the air conditioner and determines the necessity of the contaminant reduction operation based on the contaminant amount.

5. The air conditioner according to claim 1, wherein when the determination unit determines that the contaminant reduction operation is necessary, the controller performs the contaminant reduction operation under a cooling operation allowance condition so that the contaminant reduction operation maintains indoor comfort.

6. The air conditioner according to claim 2, wherein the determination unit further determines a device state of the air conditioner and then determines the necessity of the contaminant reduction operation based on a determination result of the device state.

7. The air conditioner according to claim 6, wherein the determination unit obtains a contaminant amount of at least one of a drain pan, a filter, or the indoor heat exchanger as the device state of the air conditioner and determines the necessity of the contaminant reduction operation based on the contaminant amount.

8. The air conditioner according to claim 2, wherein when the determination unit determines that the contaminant reduction operation is necessary, the controller performs the contaminant reduction operation under a cooling operation allowance condition so that the contaminant reduction operation maintains indoor comfort.

9. The air conditioner according to claim 3, wherein when the determination unit determines that the contaminant reduction operation is necessary, the controller performs the contaminant reduction operation under a cooling operation allowance condition so that the contaminant reduction operation maintains indoor comfort.

10. The air conditioner according to claim 6, wherein when the determination unit determines that the contaminant reduction operation is necessary, the controller performs the contaminant reduction operation under a cooling operation allowance condition so that the contaminant reduction operation maintains indoor comfort.

* * * * *